Patented Mar. 18, 1952

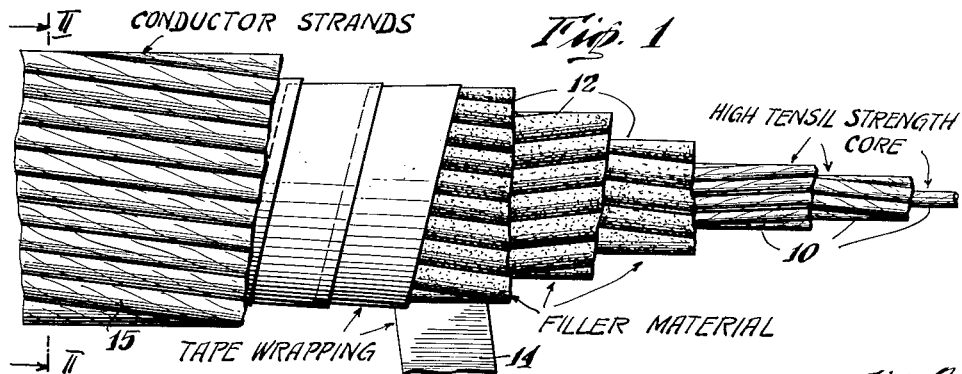
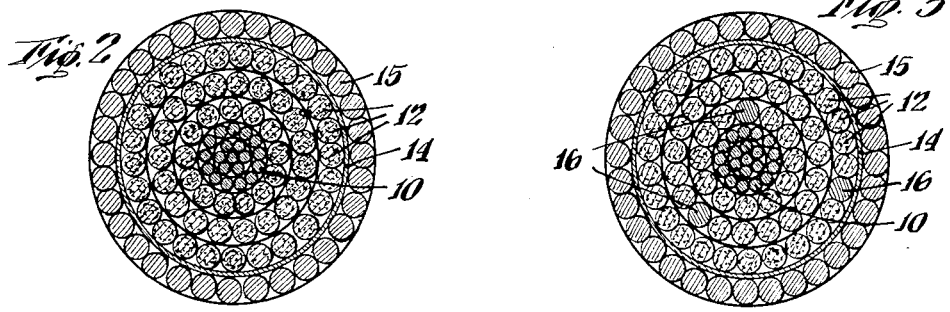
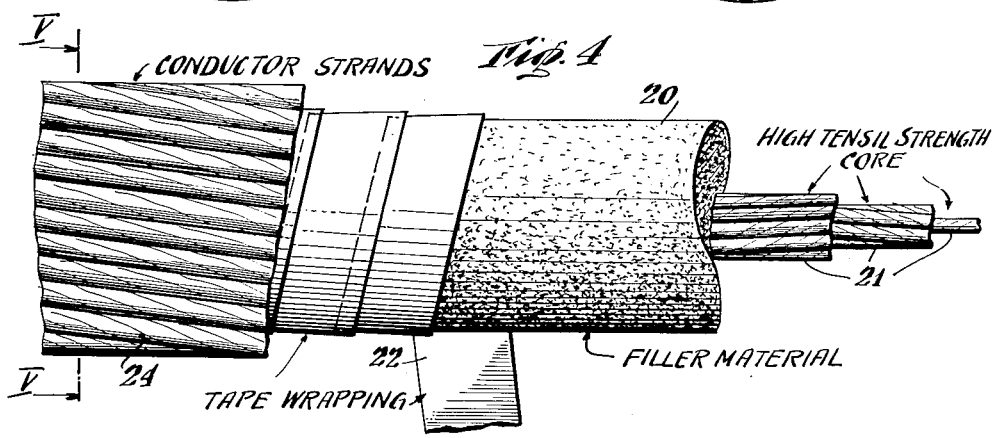
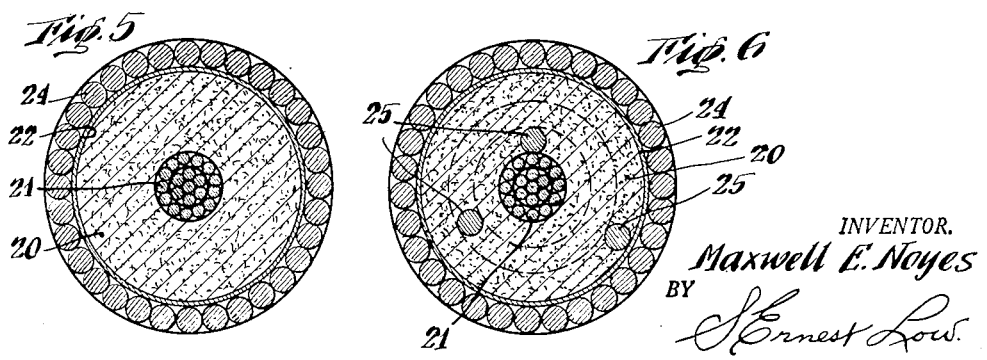

2,589,507

UNITED STATES PATENT OFFICE 2,589,507

EXPANDED ELECTRICAL TRANSMISSION CABLE

Maxwell E. Noyes, Pittsburgh, Pa., assignor to Aluminum Company of America, Pittsburgh, Pa., a corporation of Pennsylvania Application May 17, 1947, Serial No. 748,714

6 Claims. (Cl. 174—131)

This invention relates in general to improvements in cable structures, and is particularly concerned with expanded cable structures suitable for use in high voltage, overhead or aerial transmission lines. The cable structures contemplated within the scope of the invention are expanded, for a given weight of conductor metal encompassed therein, to an exterior diameter that is appreciably greater than that obtained by normal concentric cable stranding practice. The application is a continuation-in-part of co-pending application Serial No. 721,498, filed January 11, 1947, now abandoned.

Minimization of corona loss in electrical transmission line cables has long been recognized, and has been attained by expanding the external diameter of the cables, as by hollow cable construction or by employing stranded fibrous filler material, the latter type of construction being disclosed in United States Patent 2,075,996, issued April 6, 1937.

The present invention represents an improvement over the two general types of expanded cable structures referred to above, and in particular provides for an expanded cable structure that gives all the advantages of the filled type cables, as compared to hollow cables, while at the same time permitting the use of a variety of expanding or filler materials, which are relatively inexpensive, and which would normally not be suitable for such a purpose. For example, it has been recognized that the stranding of conductor wires upon filler materials of the general class defined as cellulosic or vegetable fibers, often gives rise to the formation of fine, wire-like threads or whiskers which exude between the conductor strands and set up what are termed corona points around the periphery of the expanded cable. This condition is more pronounced where the filler material is in loose or bulk form, as distinguished from the hard fibrous cords described in the aforementioned patent. However, regardless of the condition of the filler material at the time of fabrication of the expanded cable, adverse corona point formation normally prevails following continued flexing of the cable in handling and use, and it will be quite apparent that this condition would be greatly aggravated when the filler material has been applied in a loose, relatively soft state between the metallic core and outer conductor wires. Electrical power loss resulting from corona point formation may often approach or equal the advantage attributed to the expanded diameter of the cable and it is to this end that the present invention is directed, to overcome corona point formation and provide an expanded cable exhibiting advantages heretofore not associated with this type of cable structure.

It is an object of the present invention to provide an expanded, high voltage, transmission cable structure that will lend itself to the adaptation of a variety of expanding or filler materials in its manufacture.

It is another object of the invention to provide a stranded conductor which is increased substantially in its external dimension, as compared to a normal stranded cable comprising the same weight of conductor metal, yet one which exhibits appreciably lower electrical resistance and lower corona loss than characterized by known expanded cables.

A more specific object of the present invention is to provide a stranded cable structure of the steel reinforced type wherein a central high tensile steel core is separated from outer conductor strands by an intermediate filler material, a tape or sheath being employed to encase and confine the intermediate filler material and serve as a supporting surface for the exterior conductor strands.

Another object of the invention is to provide a stranded cable structure of the steel reinforced type, wherein a high tensile steel core is separated from exterior conductor strands by an intermediate layer or layers of fibrous material, a conducting tape or sheath being employed to encase and confine the intermediate fibrous material and serve as a supporting surface for exterior conducting strands.

Still another object is to provide an expanded cable structure incorporating a central high tensile core and external conductor strands of high electrical conductivity, with an intermediate expanding or filler material of fibrous nature, either in bulk or stranded condition, separating the central core and conductor strands, and having one or more metallic strands dispersed within the filler material to serve as an electrical circuit connecting member or members between the core and outer conductor strands, as well as assist in supporting the cable structure against collapse.

Other objects and advantages will present themselves upon consideration of the following description of the invention, reference being made to the accompanying drawing in which:

Fig. 1 illustrates a fragmentary elevational view of a length of expanded cable constructed in accordance with the practice of the invention, succeeding layers or lays of stranding being broken away to more clearly reveal the mode of construction;

Fig. 2 illustrates a cross-sectional elevation through the cable of Fig. 1, taken along the line II—II thereof;

Fig. 3 is a view similar to Fig. 2, but illustrating a modified form of cable construction;

Fig. 4 illustrates a fragmentary elevational view of a length of expanded cable constructed in accordance with a modified embodiment of the invention;

Fig. 5 illustrates a cross-sectional elevation through the cable of Fig. 4, taken along the line V—V thereof; and Fig. 6 is a view similar to Fig. 5, but illustrating a modified form of cable construction.

In general terms, this invention contemplates the provision of expanded cable structures which comprise an interior or central core member, preferably in the form of a stranded cable composed of high tensile strength material such as steel. Supported upon the interior core is a filler material of sufficient total thickness to appreciably expand the diameter of the cable. The filler material is preferably selected from cellulosic or vegetable fibrous material because of its inexpensive cost, light weight, and availability, and is normally impregnated with a suitable water resistant substance. A tape is wrapped or laid upon the intermediate fibrous filler to confine and encase the same, and a layer or layers of conductor strands, of high electrical conductivity, such as aluminum or copper, are stranded upon the tape surface to complete the expanded cable structure.

Various types of material may be employed as the expanding or filler material. Cellulosic or vegetable fibrous materials such as sisal, hemp, jute, felt, wood pulp products, paper, cotton, and the like, are preferred because of their economy, availability, and light weight, but many mineral fibers, such as slag wool, spun glass, or mixtures of mineral and vegetable fibers serve equally well insofar as expanding the diameter of a cable is concerned. Furthermore, the expanding materials may take numerous forms and be employed in bulk or loose form in combination with suitable binders, in which case a molding or extrusion method would be employed to affix the filler to the central core, or the filler may be stranded in cord form and be applied by normal cable stranding equipment.

The filler material need not be non-conducting, and, as will be described in more detail hereinafter, may incorporate fine metal wires or conductor strands dispersed throughout the filler layer with resulting advantages against collapse of the immediate filler material.

The tape wrapping may be of any tough material that will encompass and confine the filler material and prevent the same from exuding between the conductor strands to form corona points. Metallic foil tapes, preferably of the same material and conductivity as the outer conductor strands, are preferred, however, since such metallic tapes wrapped in overlapping relation, with or without an adhesive against the filler material, act to form a weather resistant shield and cover for the filler material, as well as to impart desired electrical characteristics to certain types of expanded cables to be hereinafter described in more detail.

The preferred form of cable structure of the invention is illustrated in Figs. 1 and 2, with a modification thereof disclosed in Fig. 3. Referring to Figs. 1 and 2, the cable therein comprises a central metallic core member of high tensile strength which is preferably formed from a plurality of helically wound or stranded galvanized steel wires 10. Supported upon the central core member are intermediate layers, three being illustrated, of fibrous strands 12, which serve to expand the cable diameter. The strands 12 may be made from any inexpensive material, sisal, hemp, cotton, paper, jute, or other suitable preferably impregnated material serving the purpose of the invention. Where a plurality of concentric layers of filler strands 12 are employed, it is preferred that opposite lays be used in stranding, as illustrated in Fig. 1.

A foil tape 14 is wrapped upon the outermost layer of fibrous strands 12 to completely encase and confine the same. The tape is helically wrapped in overlapping relationship and may be provided with an adhesive on its underside to insure its affixation to the fibrous strands, as well as to provide a moisture-proof joint along its overlapped edges.

An outer sheath of helically wound conductor wires 15, which are of high electrical conductivity, are supported upon the cylindrical surface presented by the foil tape 14. The wires 15 may be of copper or aluminum, or alloys thereof, and the tape 14 is preferably selected in the same material as the conductor strands 15.

Considering the entire cable structure as thus described, it is preferred to helically wind successive adjacent layers of conductive wires making up the composite cable in opposite directions. This is a significant feature, since it improves the electrical characteristics of the cable where a steel core is employed as the tensile strength imparting member in a reinforced cable structure. The steel core is magnetic and a layer or layers of conductor strands, such as the wires 15, separated therefrom and spirally surrounding the same, will, under certain conditions of current density, induce a current in the magnetic core. This condition of induction will be greatly nullified and, in some instances eliminated, by laying the foil tape 14 which, in itself, is a conductor, in a direction opposite to that of the outer conductor strands or wires 15.

In Fig. 3, a modified form of expanded conductor or cable structure is illustrated. In this particular form of the invention, one or more conductor wires 16 are included in the fibrous strands or cords 12, and helically wound therewith, making up the intermediate or filler section of the cable. Since the individual layers of strands 12 and 16 are helically wound in opposite directions, electrical contact will be made between the interior steel core 10 and the outer conductor strands 15 by way of wires 16 contacting one another in the helical winding of the intermediate expanding or filler portion of the cable. The wire strands 16 also serve as a rigid skeleton structure within the fibrous material 12 to strengthen the cable against collapse.

The cross-sectional views illustrated at Figs. 2 and 3 disclose the fibrous material in the form of concentric layers of cords or strands 12. It will be quite apparent to those skilled in the art that the individual fibrous cords will, in all likelihood, be compressed into polygonal cross-sectional form to fill the entire space between the interior core and outer conductor strands. It is likewise possible to substitute individual cords or strands incorporating metallic wires, such as employed in the issued patent referred to hereinabove. Also, a single strand or cord of filler material could be substituted for the three concentric layers or strands 12.

In Figs. 4 through 6, an embodiment of the invention has been illustrated in which the filler material 20 is in bulk or loose form, having been applied in combination with a suitable binder, that could also serve as a water repellant, as by a molding or extrusion operation, upon the surface of the central high tensile strength core or stranded members 21. A moisture repellant tape 22, preferably metallic, is helically wound, in overlapped relation upon the exterior surface of the filler material, with or without the use of an adhesive, and conductor strands 24 are supported upon the surface presented by the tape wrapping. In Fig. 6, conductor wires 25 are embedded in helical strand winding within the filler 20 in a manner similar to conductors 16 in Fig. 3 of the invention.

It will be understood and appreciated from a reading of the specification thus far that high voltage electrical transmission cables have been provided which give all the advantages of the expended cables now known in the art, while overcoming certain disadvantages inherent in the prior art structures, such as insuring against the formation of corona points by encasing and confining the filler material, regardless of its nature, quality and hardness, within a wrapping of tape, preferably a metallic tape; improving electrical resistance by eliminating induced current flow in a magnetic strengthening core by interpositioning conductive foil tape in opposite lay to that of the adjacent contacting conductor wires; and excluding entrance of moisture into the intermediatie expanding, filler material by enclosing the same in a moisture proof wrapping.

With respect to the filler material employed in expanding the various cable structures of the invention, vegetable and mineral fibers, or combinations thereof, have been specified as being satisfactory. Filler materials exhibiting sufficient longitudinal tensile toughness to withstand pulling apart, cracking or separating during normal flexing and bending of the cables in which they have been employed are preferred, whether this characteristic is a natural property of the material or acquires the characteristic through its bonding agent, as in the case of a bulk application of filler. The filler material may or may not be conductive, and it is not generally intended that it add to the overall tensile strength of the cable, although such added strength is not outside the contemplated scope of the invention.

While the improved expanded cable structures of the invention have permitted the use of readily available and inexpensive filler materials, without any appreciable additional weight for a given weight of conductor metal encompassed therein, it has also been found that expanded cables of the type hereinabove described, and contemplated within the scope of the invention, are less susceptible to fatigue than cables composed entirely of metal.

Having thus described the invention in specific structural forms, it is to be understood that equivalent materials and arrangement of the elements will suggest themselves to those skilled in this art, and it is intended that the invention should not be limited except in so far as it has been defined in the appended claims.

What is claimed is:

1. An electrical aerial cable comprising a central core of helically wound steel wires of high tensile strength, a fibrous material supported upon said central core to appreciably increase its diameter, a metallic strand incorporated in said fibrous material serving as a rigid support therein, a metallic foil tape wrapped upon the said fibrous material in overlapped relationship to encase and confine the same against formation of corona points, a plurality of external conductor strands of high electrical conductivity helically wound and exposed upon the surface presented by the foil tape, and said incorporated metallic strand making electrical contact between the central core and metallic foil tape.

2. A concentrically stranded electrical aerial cable comprising a central core of high tensile strength in the form of helically wound high tensile steel wires, a fibrous material wound upon said central core to appreciably increase its diameter, a metallic strand incorporated in said fibrous material serving as a rigid support therein, an outer layer of helically wound and exposed external conductor wires of high electrical conductivity, an intermediate metallic foil tape wrapped in overlapped relationship upon said fibrous material to encase and confine the same against formation of corona points, said metallic foil tape being of the same material as said conductor strands and having a lay opposite to that of the conductor strands, and said incorporated metallic strand making electrical contact between the central core and metallic foil tape.

3. A concentrically stranded electrical aerial cable exhibiting high voltage carrying capacity, said cable comprising a central core of high tensile strength in the form of helically wound high tensile steel wires, a fibrous material in bulk form bonded together and supported upon said central core to appreciably increase its diameter, a metallic strand incorporated in said fibrous material serving as a rigid support therein, an outer layer of helically wound and exposed external conductor strands of high electrical conductivity, an intermediate metallic foil tape helically wrapped in overlapping relationship upon the fibrous material to encase and confine the same against formation of corona points and serve as a supporting surface for said outer layer of conductor strands, said metallic tape being of substantially the same material as said conductor strands, said foil tape being of opposite lay to the supported layer of conductor strands, and said incorporated metallic strand making electrical contact between the central core and metallic foil tape.

4. A concentrically stranded electrical aerial transmission cable exhibiting high voltage carrying capacity, said cable comprising a central core of high tensile strength in the form of helically wound high tensile steel wires, a fibrous material in corded strands helically wound upon said central core to appreciably increase its diameter, a metallic strand incorporated in the corded strands of fibrous material and serving as a rigid support therein, an outer layer of helically wound and exposed external conductor strands of high electrical conductivity, and an intermediate metallic foil tape helically wrapped in overlapping relationship upon the fibrous material to encase and confine the same against formation of corona points and serve as a supporting surface for the outer layer of conductor strands, said incorporated metallic strand making electrical contact between the central core and the metallic foil tape, said metallic foil tape and incorporated strand being of substantially the same material as the outer conductor strands, and said foil tape being of opposite lay to the supported layer of conductor strands.

5. A concentrically stranded electrical aerial cable comprising a central core of high tensile strength in the form of helically wound high tensile steel wires, a fibrous material in corded strands spirally wound upon said central core to appreciably increase its diameter, a metallic strand incorporated in the corded strands of fibrous material and serving as a rigid support therein, an outer layer of helically wound and exposed external conductor strands of high electrical conductivity, and an intermediate metallic foil tape helically wrapped in overlapping relationship upon the fibrous material to encase and confine the same against formation of corona points and serve as a supporting surface for said outer layer of conductor strands, said metallic tape being of substantially the same material as said conductor strands, and all of said strands being of opposite lay in adjacent concentric layers.

6. A concentrically stranded electrical aerial transmission cable of high voltage carrying capacity, said cable comprising a central core of helically wound high tensile strength steel wires, a plurality of layers of fibrous filler material in cord form helically wound on said central core, at least one metallic strand incorporated in each layer of filler material, an outer layer of helically wound and exposed external conductor strands of high electrical conductivity, and an intermediate metallic foil tape helically wrapped in overlapping relationship upon the fibrous filler material to encase and confine the same against formation of corona points and serve as a supporting surface for the outer layer of conductor strands, said layers of fibrous material and incorporated metallic strands, metallic foil tape, and outer conductor strands being of opposite lay in concentric layers.

MAXWELL E. NOYES.

REFERENCES CITED

The following references are of record in the file of this patent:

UNITED STATES PATENTS

| Number | Name | Date |
|---|---|---|
| 1,199,789 | Hochstadter | Oct. 3, 1916 |
| 1,705,913 | Gilbert | Mar. 19, 1929 |
| 1,821,887 | Fowle | Sept. 1, 1931 |
| 2,019,297 | Faucett | Oct. 29, 1936 |
| 2,075,996 | Noyes | Apr. 6, 1937 |
| 2,217,284 | Lunt | Oct. 8, 1940 |
| 2,375,067 | Bennett | May 1, 1945 |

FOREIGN PATENTS

| Number | Country | Date |
|---|---|---|
| 135,136 | Austria | Oct. 25, 1936 |
| 640,818 | France | Apr. 3, 1928 |